(12) United States Patent
Külm

(10) Patent No.: US 12,268,129 B2
(45) Date of Patent: Apr. 8, 2025

(54) STUMP CRUSHER

(71) Applicant: DIPPERFOX OÜ, Pärnu (EE)

(72) Inventor: Jaana Külm, Pärnu (EE)

(73) Assignee: DIPPERFOX OÜ, Pärnu (EE)

( * ) Notice: Subject to any disclaimer, the term of this patent is extended or adjusted under 35 U.S.C. 154(b) by 236 days.

(21) Appl. No.: 18/030,693

(22) PCT Filed: May 20, 2021

(86) PCT No.: PCT/EP2021/063479
§ 371 (c)(1),
(2) Date: Apr. 6, 2023

(87) PCT Pub. No.: WO2022/078635
PCT Pub. Date: Apr. 21, 2022

(65) Prior Publication Data
US 2023/0397548 A1 Dec. 14, 2023

(30) Foreign Application Priority Data

Oct. 14, 2020 (EP) ..................................... 20201655

(51) Int. Cl.
*A01G 23/06* (2006.01)

(52) U.S. Cl.
CPC .................................. *A01G 23/067* (2013.01)

(58) Field of Classification Search
CPC .................................................. A01G 23/067
See application file for complete search history.

(56) References Cited

U.S. PATENT DOCUMENTS

| | | | | |
|---|---|---|---|---|
| 1,164,659 | A * | 12/1915 | Moore | A01G 23/067 |
| | | | | 408/211 |
| 9,137,955 | B1 * | 9/2015 | VanDusartz | A01G 23/06 |
| 9,382,689 | B2 * | 7/2016 | Chapman | E02F 9/202 |
| 9,456,558 | B2 * | 10/2016 | Fraley | A01G 23/067 |
| 2014/0326362 | A1 | 11/2014 | Lowe | |

FOREIGN PATENT DOCUMENTS

EP 2077069 A1 7/2009

OTHER PUBLICATIONS

ISR for International Application No. PCT/EP2021/063479 mailed Sep. 23, 2021.
Written Opinion for International Application No. PCT/EP2021/063479 mailed Sep. 23, 2021.

* cited by examiner

*Primary Examiner* — Matthew Katcoff
(74) *Attorney, Agent, or Firm* — LADAS & PARRY LLP

(57) ABSTRACT

This invention includes a stump crusher used as an attachment for an excavator or some other digging machine or a forest harvester to mill the stumps of felled trees level with the ground. The stump crusher comprises interconnected and interacting assemblies including a hydraulic motor assembly on the side of the machine implement comprising a hydraulic motor housing, a hydraulic system necessary for controlling the hydraulic motor arranged in the hydraulic motor housing, a gearbox connected to the hydraulic motor and attached to the gearbox housing, to the lower end of which is attached a flange, to which is attached a blade holder of the stump crusher together with the blades of the stump crusher.

4 Claims, 3 Drawing Sheets

STUMP CRUSHER

CROSS REFERENCE TO RELATED APPLICATIONS

This application is a U.S. National Stage Application under 35 U.S.C. § 371 of International Application No. PCT/EP2021/063479 which was filed on 20 May 2021, which claims priority from EP Application Serial No. 20201655.6 filed 14 Oct. 2020 the disclosures of which is incorporated in their entirety by reference herein.

TECHNICAL FIELD

The present invention is in the field of mechanical engineering and includes an attachment for an excavator or some other digging machine or a forest harvester, which is intended for removing the stumps resulting from forest harvesting or tree felling. More specifically, the invention is related to an attachment for such machines, i.e., a stump crusher, which is used to mill stumps level with the ground.

BACKGROUND ART

Quite a lot of different stump removal or grinding devices are known in the art, which can be attached to tractors, excavators or other forestry machines or their cam.

In GB 2449 953, 10 Dec. 2008, Brian Mence describes a self-loading wood crusher, which comprises means of collecting and inserting wood material, crushing means and an outlet for the crushed material. At that, for crushing the material, the crusher comprises a rotor and a drive connected to the rotor, wherein the rotor is equipped with a number of crushing elements and the means of collecting and inserting wood material is an excavator bucket. Using this device requires the prior uprooting of the stumps created in tree felling, which is time-consuming and resource-intensive.

In CA 2128259, 5 Jan. 1999, Bot Silvio describes a machine for grinding/milling tree stumps level with the ground. The machine comprises a sled structure, which comprises fastening loops for releasably connecting the sled to the moving cam of an excavator or other tillage machine. The sled has sliding skis for guiding the device with the moving cam over the soil adjacent to the stump. The sled is equipped with a drive, which has a transmission and an autonomous fuel source. The grinding wheel of the sled is attached to the sled for rotation around the horizontal axis and connected to the transmission of the drive. The wheel has a working surface rubbing against the stump with replaceable teeth, which chop or grind the stump into chips and dig it into the ground. This is a complex and clumsy device, and working with it consumes a lot of time and wears down the teeth of the working surface to a great degree.

In BR 102018070436-2, 22 Apr. 2020, HIMEV INDUSTRIA describes a stump grinding machine having a centre pivot head assembly mounted and secured near the centre of the front of the machine to support and guide the cutter assembly. The rear part of the pivot head assembly is mounted in the middle of the front of the frame or body of the stump grinder by means of a mounting plate. The mounting plate supports the rear part of the pivot head assembly, which generally rotates around the vertical axis.

The main disadvantage of the prior art solutions is the need for special fasteners and drives, which in turn does not allow the cutting heads used to remove stumps to be used on the cams or implements of conventional excavators, tractors or other forestry machines.

Document U.S. Pat. No. 9,382,689 B2 (CHAPMAN RICHARDT, et al, 5 Jul. 2016 discloses a stump crusher comprising a frame supporting a motor and gearbox, the bit assembly is connected to the gearbox. The bit assembly comprises a shaft attached to the gearbox assembly and the main bit assembly. The main bit assembly comprises one or more cutting blades and a shaft. The shaft is connected to the upper bit assembly at the shaft's upper portion and to the guide bit assembly at the shaft's lower portion. The main bit assembly comprises one or two lower cutting blades. The lower cutting blades are attached to the shaft at a point below the attachment point of the upper cutting blades. The lower cutting blades comprise both a cutting edge and a main body. The cutting edges are adapted to engage or "bite into" the stump to be destroyed. The main disadvantage of the proposed stump crusher is special frame to be connected to the vehicle. This solution does not allow stumps to be crushed on difficult, inaccessible terrains, as the vehicle has to drive separately to each stump. In principle, the frame only allows the stump crusher to move up and down and horizontal placement to the stump. There is no dynamic 3-axis directional movement of the stump crusher without moving the vehicle, i.e. after crushing the stump the vehicle with stump crusher must move to the next stump. Another disadvantage is related to the stiffness of the blades, i.e. when the stump crusher is placed to the stump and it will be pushed down the blades start to bend through and may therefore break, which significantly reduces the productivity of the machine.

Document D2 EP 2 077 069 A1, BIJL GROENTECHNIEK BV. 8 Jul. 2009 discloses a tree stump drill for removing tree stumps comprising a rotatable shaft, at least one knife extending in radial direction and connected to the shaft and a guide element. Said guide element is annular and is arranged at a distance from and round the shaft. The guide element of the tree stump drill allows said drill to be better centered on the tree stump to be re-moved, so that sliding or slipping of the tree stump drill over tree stumps can effectively be prevented. The guide element supports blades and bind them together but still when the stump crusher is placed to the stump and it will be pushed down the design of guide element and blades starts to bend through and may therefore break.

Document EP 0 214 977 A1 KETONEN LAURI, 25 Mar. 1987 discloses a tree-harvester operating system by means of which at least one tree-feeder motor, a crosscut saw, and the operation of a cylinder operating at least one function of the feeder and the blades, the two-direction rotation of a tree-feeder motor is achieved by feeding pressurized oil from the power take-off machine alternatively along additional hose lines and one-direction rotation of the crosscut saw is achieved by preventing the operation of the tree-feeding motor by means of additional valves. Said hydraulic system can be used in stump crusher but It must be borne in mind that the rotational forces applied to the blades change constantly when drilling the stumps, and the machine operator must constantly check the speed of the cutting head, the pressure applied to the cutting head, etc. This makes working quite stressful. Therefore a solution of hydraulic control system is needed which can automatically adapts to the resistance forces of drilling the stump.

DISCLOSURE OF INVENTION

The objectives of the stump crusher according to the present invention are achieved with a simple implement, which can be attached to the implement of an excavator or another forestry machine by a mounting plate attached to the stump crusher. At that, it is possible to produce a corresponding adapter plate between the stump crusher and the implement of the machine, which facilitates the attachment of the stump crusher. The structure of the stump crusher itself consists of four interconnected assemblies. The lower part of the stump crusher, i.e., the blade holder, is attached to the gearbox housing. A hydraulic motor is connected to a gearbox in a gearbox housing, which in turn is attached to the motor housing, which has a hydraulic system for controlling the hydraulic motor at the top and a mounting plate for attaching the stump crusher to the implement of a work machine, e.g., the cam of an excavator. Thus, a uniform and compact stump crusher is formed with the blade holder composed of the mounting plate of the blade holder. A blade holder tower is welded to the centre of the mounting plate, to the lower end of which a blade holder cone, i.e., an auger, is attached. Attached to the lower end of the blade holder tower are perpendicular blade holder plates to which the replaceable blades of the stump crusher are attached. The blade holder plates are supported by blade holder reinforcement ribs from the perimeter of the mounting plate to the blade holder plate for providing stability and reinforcement. The blade holder tower is also supported by two ribs, the lower end of which is welded to the blade holder plates and the top end to the mounting plate.

The circular mounting plate of the blade holder of the stump crusher is attached to the flange at the lower end of the gearbox housing with fasteners. The gearbox is fastened to the flange at the top end of the gearbox with fasteners. The gearbox is connected to the hydraulic motor, so that when the motor rotates, the gearbox rotates together with the housing, with which the blade holder of the stump crusher also rotates. The hydraulic motor is attached to the motor housing, which is rigidly fixed to the excavator implement, i.e., the cam, via the mounting plate in the top part of the motor housing. The hydraulic motor of the stump crusher is completely controlled by the hydraulic system housed in the motor housing. The hydraulic system of the excavator is connected to the hydraulic system via hydraulic hoses, so that two hoses are intended for the forward/return flow of hydraulic fluid, usually special hydraulic oil, and the third hose is intended for oil return drainage. The hydraulic system includes a control valve/directional valve to direct the oil supply or drainage to the hydraulic motor. Furthermore, the hydraulic system is provided with pressure relief valves, non-return valves, and a hydraulic accumulator has also been added to the system to stabilise the operation of the hydraulic motor, so that the rotations of the blade holder of the stump crusher is uniform according to the force applied by the implement. This enables to increase the stump crusher's productivity for drilling out stumps with various diameters.

The invention is set out in the appended set of claims.

BRIEF DESCRIPTION OF DRAWINGS

The structure of the stump crusher will now be described in more detail with reference to figures, wherein.

DETAILED DESCRIPTION OF EMBODIMENT

Figure 1:
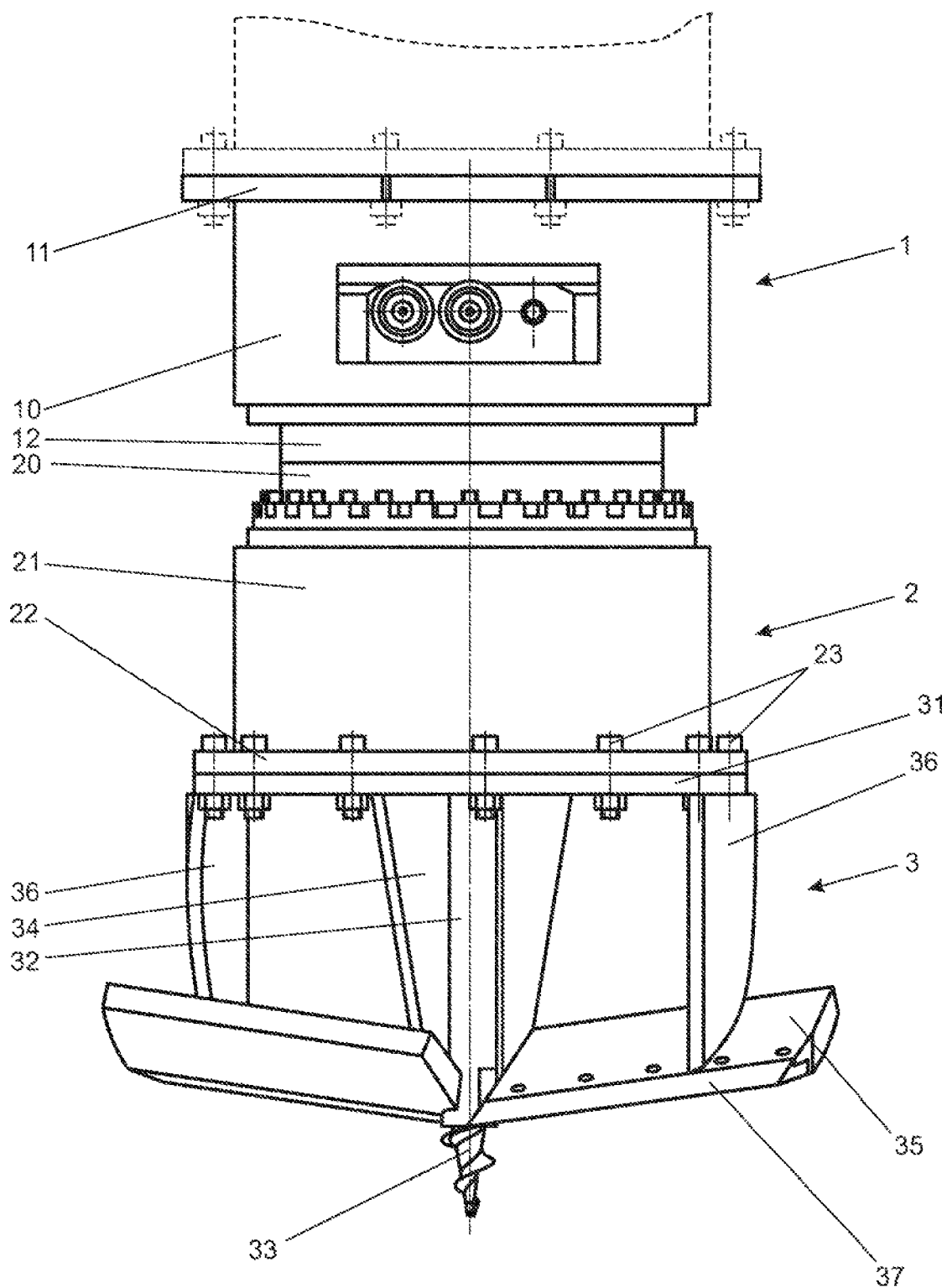
FIG. 1 is a side view of the stump crusher according to the invention for illustrating the position of all assemblies.
Figure 2:
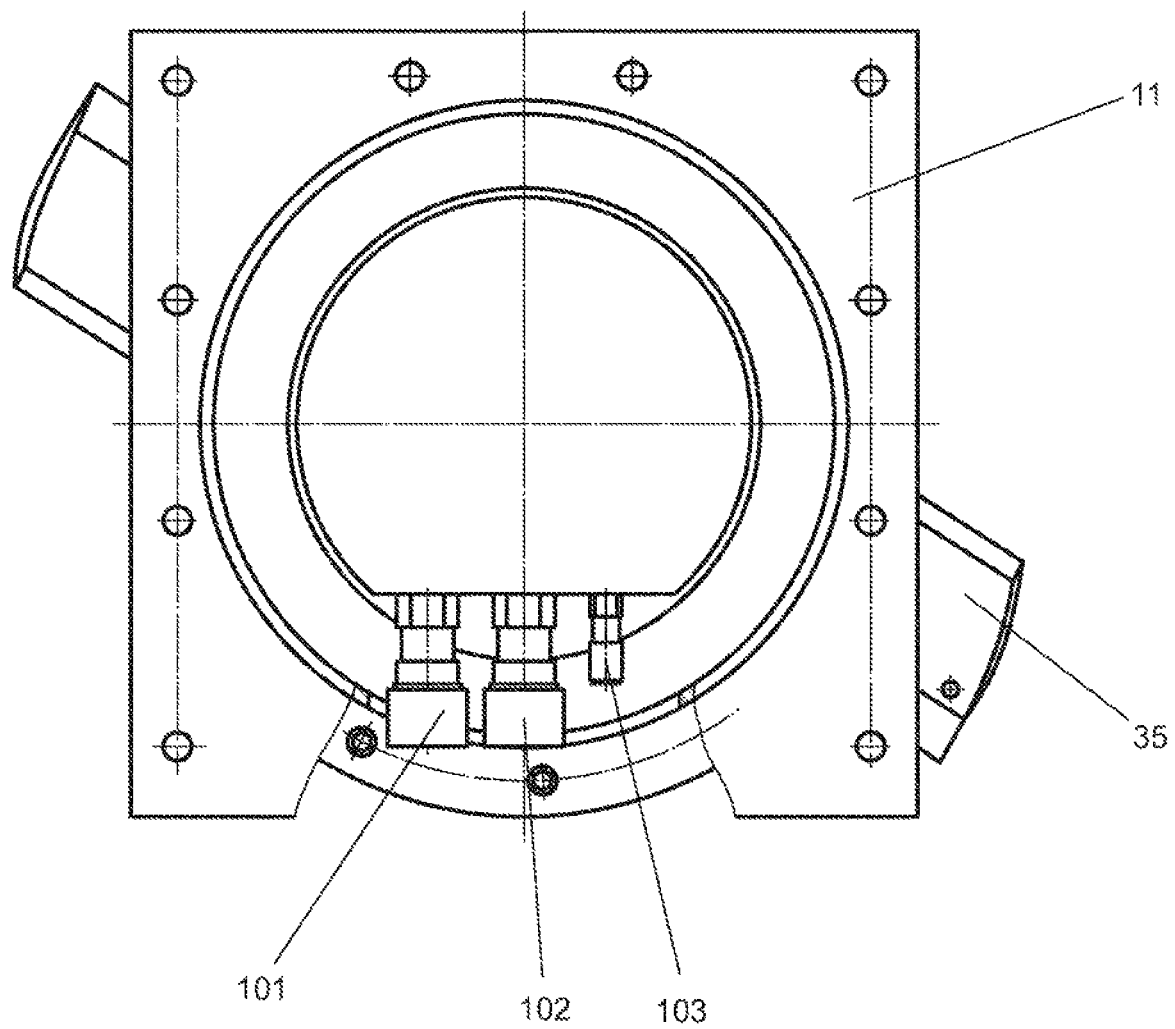
FIG. 2 is a top view of the stump crusher from the end facing the mounting plate.
Figure 3:
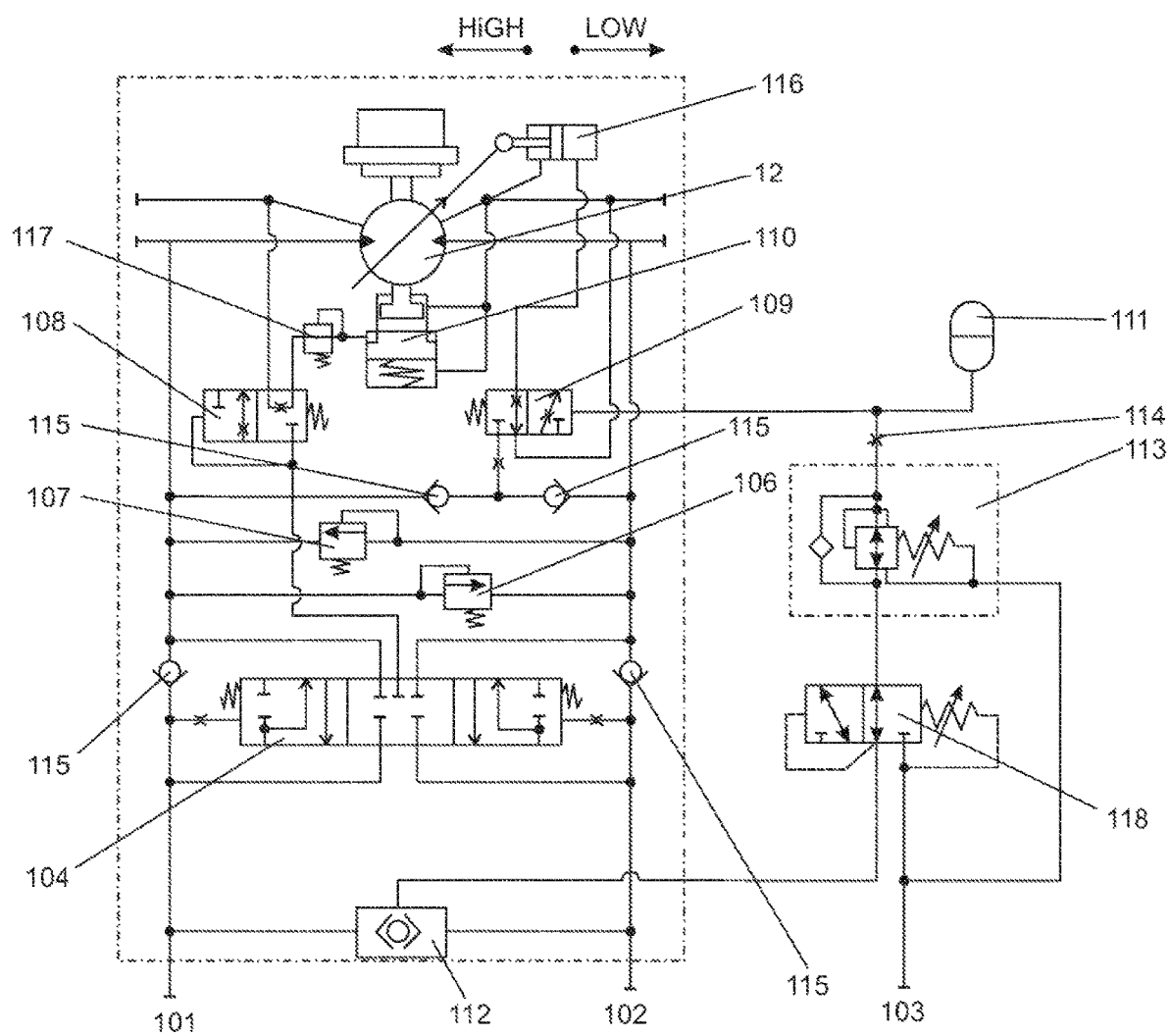
FIG. 3 is a conceptual scheme of the hydraulic system of the stump crusher.

The stump crusher shown in FIG. 1 contains four interconnected and interacting assemblies. On the side of the working machine implement is a hydraulic motor assembly 1, which includes the motor housing 10, and to this side of the working machine implement is attached, e.g., welded, a mounting plate 11, which is used to fasten the stump crusher to the working machine implement, e.g., the excavator cam. If needed, an adapter is used between the mounting plate 11 and the implement (shown in the figure with a dashed line), so that the stump crusher can be used with the implements of various working machines (excavators, tractors or other forestry machines). The hydraulic system necessary for controlling the hydraulic motor is arranged in the motor housing 2. Its structure is described below.

The motor housing houses a hydraulic motor 12 to which is connected a gearbox 20 to ensure a smooth and stable rotation of the stump crusher. The gearbox 20 is attached to the gearbox housing 21. With the operation of the hydraulic motor, rotation is transferred to the gearbox, which rotates together with the blade holder of the stump crusher. Bearings are arranged between the gearbox and the motor to ensure smooth, unobstructed rotation. A gearbox flange 22 is welded to the lower end of the gearbox housing 21, to which a blade holder 3 of the stump crusher is attached with fasteners 23.

The blade holder 3 of the stump crusher consists of a circular mounting plate 31 of the blade holder, which is attached with fasteners 23 to the gearbox flange 22 of the gearbox housing 21. Attached to the centre of the mounting plate is a blade holder tower 32, at the end of which is the cone 33 of the stump crusher, which is a conical auger. This is necessary for facilitating the entrance of the stump crusher into the stump. When the rotating stump crusher is placed against the stump, the auger starts pulling itself into the stump together with the stump crusher, thus accelerating the arrival of the blades of the stump crusher to the stump. At the same time, the auger allows the operator to guide the stump crusher relatively precisely to the centre of the stump. The blade holder tower is supported from two sides by tower reinforcement ribs 34 to ensure rigidity, the top end of which is welded to the mounting plate and the lower end to the blade holder of the stump crusher. Horizontal blade holders 35 are arranged at the lower end of the blade holder of the stump crusher. Approximately ⅔ of the way from the blade holder tower, the blade holders are supported by a horizontal blade holder reinforcement rib 36, the top end of which is attached to the perimeter of the mounting plate of the blade holder with a weld. This avoids the stump crusher blades from bending when the stump crusher is forced into the stump. A step is formed in the blade holder of the stump crusher, to which the replaceable blade 37 of the stump crusher is attached. In the exemplary embodiment illustrated in the drawings, the stump crusher has two blade holders with a replaceable blade 37. This way, the structure of the blade holder assembly of the stump crusher is in balance and the structure will not break under the forces acting upon it.

The hydraulic system for controlling the hydraulic motor of the stump crusher first comprises three inlet nozzles 101, 102, 103, to which the hydraulic system of the excavator implement is connected by means of hydraulic hoses. At that, two inlet nozzles 101 and 102 are intended for the forward and return flow of the fluid used by the hydraulic system (usually a special hydraulic oil), and the third nozzle 103 is intended for the drainage of the return flow of oil. The nozzles are connected via pipes to the control valve/directional valve 104 controlling the operation of the hydraulic system and the motor, which is used to direct oil through various connection channels (pipes) to the hydraulic motor 12 in order to start it and to change its rotation speed according to the load resulting from the drilling of the stump. The return flow of all the fluid moving into the hydraulic system takes place through the said control valve. In addition, pressure limiters 106, 107 have been placed between the forward/return flow piping. Non-return valves 115 are used in the hydraulic system to limit the return flow of the hydraulic fluid. To control the operation of the motor, both of the outlets of the motor are fitted with additional first and second control valves 108, 109 to control the fluid returning from the motor before the control valve. The first additional control valve 108 is also connected to the control valve 110 of the motor via a pressure limiter 117. The second additional control valve 109 is connected to the engine control lever 116 and further to a hydraulic accumulator 111.

An additional valve 112 is connected between the inlet nozzles and before the control valve 118, which is connected to a proportional valve/pressure limiter 113. The control valve 118 equalizes the pressure during the stump crushing and allows automatic control of the hydraulic motor by increasing or decreasing its speed without operator intervention, thus the stump crusher according to present invention can automatically adapts to the resistance forces of drilling the stump.

The latter is connected to the hydraulic accumulator 111 and to the drainage of the return flow of the fluid to the working machine's system. An additional throttle 114 is placed between the hydraulic accumulator and the valve/pressure limiter 113.

The structure of the stump crusher's gearbox is designed to reduce the angular speed of the motor shaft, in order to reduce the rotation speed of the stump crusher, but to increase torque and the transmission power of the stump crusher. A multi-stage planetary gearbox is used as the gearbox, which consists of external and internal gears. The structure of the gearbox does not need any further description, as the purposes for which the gearbox is used are clear to a person skilled in the art, and the gearbox used in the structure of the stump crusher does not have any differences compared to gearboxes known in the art, while it is important to reduce engine speed and increase torque.

Working with a stump crusher according to the invention is easy and fast. For example, it can be fitted to an excavator with a minimum power of 74 kW (ca 100 hp), oil pressure of the implement in the range of 195-350 bar (19500 kPa-35000 kPa), oil flow 110-220 l/min, weight of the excavator 16-30 t (tons), to ensure sufficient pressure to the stump crusher when it is placed on the stump. The weight of the stump crusher itself is in the range of 450-650 kg.

To use the stump crusher, it is attached to the excavator implement, an adapter is used as a spacer, if necessary, so that the stump crusher can be attached to implements of various sizes. The hydraulic system of the excavator is then connected to the hydraulic system via hoses for controlling the motor of the stump crusher. With the excavator implement, the stump crusher is lifted on the stump of a felled tree, wherein the cone or auger at the end of the blade holder tower of the stump crusher enables the excavator operator to align the stump crusher with the centre of the stump. The operator starts the hydraulic motor of the stump crusher, and with the excavator implement, the auger is forced into the stump; as the stump crusher rotates, the auger draws the stump crusher with it and the horizontal blades of the stump crusher mill the stump level with the ground or up to 1 meter below it. Then the stump crusher is lifted up and directed to a next stump. The significant part of the entire work process is that the hydraulic system controls the motor speed automatically without any interference from the operator. In the stump milling process, it is also significant that the stumps do not have to be extracted from the ground prior to milling, and as a result of milling the stumps with a stump crusher according to the invention, an even and level ground is left where new trees can be planted. Also, the area where the stumps were milled can immediately be used by other machines without any obstacles. Using the stump crusher according to the invention is especially time-saving and effective when renewing city parks. By using the stump crusher, a stump can be removed in no more than 20 seconds, it is also possible to drill to a depth of up to a meter and the new hole can immediately be used for planting a new tree.

LIST OF DETAILS

1—hydraulic motor assembly
10—motor housing
11—mounting plate
2—motor housing
12—hydraulic motor
20—gearbox
21—gearbox housing
22—gearbox flange
3—blade holder
23—fasteners
31—mounting plate of the blade holder
32—blade holder tower
33—cone of the stump crusher
34—tower reinforcement rib
35—horizontal blade holder
36—horizontal blade holder reinforcement rib
37—replaceable blade
101, 102, 103—inlet nozzles for connecting hydraulic hoses
101—first nozzle for the forward flow
102—second nozzle for the return flow
103—third nozzle for drainage of the return flow of oil
104—control valve/directional valve
106, 107, 117—pressure limiters
108—first control valve
109—second control valve
110—control valve of the motor
111—hydraulic accumulator
112—additional valve
113—valve/pressure limiter
114—additional throttle
115—non return valves
116—engine control lever
118—control valve

The invention claimed is:
1. A stump crusher comprising interconnected and interacting assemblies, which are:
   a hydraulic motor assembly (1) on the side of a working machine implement, comprising a hydraulic motor housing (10) and a mounting plate (11) attached to the end of the machine implement for attaching the stump crusher to the working machine implement;
   a hydraulic system necessary for controlling the hydraulic motor (12) arranged in a housing (2) of the hydraulic motor;
   a gearbox (20) connected to the hydraulic motor (12) and attached to a gearbox housing (21), to the lower end of which is attached to a gearbox flange (22), to which is attached a blade holder (3) of the stump crusher, characterised in that the blade holder (3) of the stump crusher consists of a circular mounting plate (31) of the blade holder, which is attached with fasteners to the gearbox flange (22) at the lower end of the gearbox housing (21);

attached to the centre of the circular mounting plate (31) is a blade holder tower (32), at the end of which is the cone (33) of the stump crusher;

the blade holder tower (32) is supported from two sides by tower reinforcement ribs (34) to ensure rigidity, the top end of which is welded to the circular mounting plate (31) and the lower end to the blade holder of the stump crusher;

at the lower end of the blade holder (3) of the stump crusher are arranged horizontal blade holders (35), which are approximately ⅔ of the way from the blade holder tower (32) supported by a horizontal blade holder reinforcement rib (36), the top end of which is attached to the perimeter of the mounting plate (31) of the blade holder;

a step is formed in the horizontal blade holder (35) of the stump crusher, to which the replaceable blade (37) of the stump crusher is attached.

2. The stump crusher according to claim 1, characterised in that the hydraulic system for controlling the hydraulic motor of the stump crusher comprises three inlet nozzles (101, 102, 103), to which the hydraulic system of the working machine implement is connected by means of hydraulic hoses, wherein two inlet nozzles (101, 102) are intended for the forward and return flow of the fluid used in the hydraulic system and the third nozzle (103) is intended for the drainage of the return flow of the fluid, wherein the nozzles are connected via pipes to the control valve/directional valve (104), which is used to direct oil through pipes to the hydraulic motor in order to start it and to change its rotation speed, wherein the return flow of the fluid moving in the hydraulic system takes place through the said control valve (104), the hydraulic system also includes pressure limiters (106, 107) between the forward/return flow piping, and an additional first (108) and second (109) control valve fitted to both of the outlets of the motor before the control valve (110) to control the operation of the motor.

3. The stump crusher according to claim 2, characterised in that the first additional control valve (108) is connected to the control valve (110) of the motor via a pressure limiter (117) and the second additional control valve (109) is connected to the motor control lever (116) and to the hydraulic accumulator (111) of the stump crusher.

4. The stump crusher according to claim 3, characterised in that an additional third valve (112) is connected between the inlet nozzles (101, 102) before the control valve (118) and to a proportional valve/pressure limiter (113), which is connected to the hydraulic accumulator (111) and the drainage of the return flow of the fluid to the machine's system.

* * * * *